Oct. 31, 1933.  L. EISELE  1,932,578
CLINICAL THERMOMETER
Filed Nov. 25, 1932
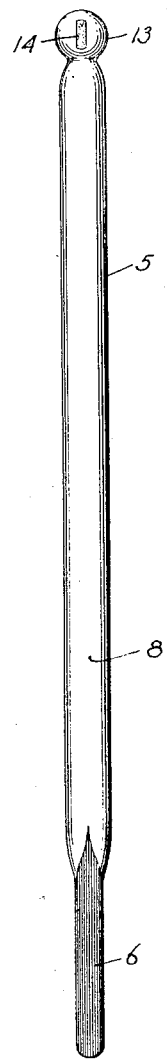
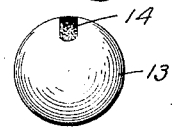
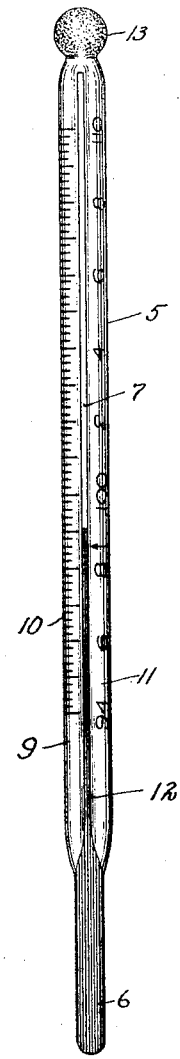
INVENTOR.
LOGAN EISELE
BY
J. Granville Meyers
ATTORNEY.

Patented Oct. 31, 1933

1,932,578

UNITED STATES PATENT OFFICE 1,932,578

CLINICAL THERMOMETER

Logan Eisele, Nashville, Tenn.

Application November 25, 1932
Serial No. 644,344

4 Claims. (Cl. 73—52)

My invention relates to clinical thermometers.

Clinical thermometers of the usual type consist of a glass body of substantially triangular cross-sectional shape having a non-transparent insert or coating along one side, which may be termed the base, and on the other converging sides a scale and numbers respectively, with the numbers arranged in proper relation to the scale markings. The line along which the last two sides meet serves as a lens to magnify the mercury column within the thermometer so that the position of the top of the mercury column relative to the scale markings and numbers between which it appears through the lens may be clearly observed when the thermometer is properly positioned with the lens and mercury column alined in the line of vision of the observer. It is somewhat difficult, however, to properly establish the lens and mercury column in the line of vision of the observer to facilitate reading of the mercury column relative to the scale.

It is also the usual practice to shake the thermometer before taking a patient's temperature, so that the mercury column will be below the normal temperature markings on the scale. In doing this, it is customary to grasp the upper end of the thermometer so that the mercury column will be shaken down.

The principal object of the present invention is to provide a clinical thermometer of the above general type with means to facilitate positioning of the thermometer for a clear reading, such means being in the nature of a clearly visible indication when the lens and mercury column are properly alined in the line of vision of the observer.

It is also an object of the present invention to provide the foregoing means preferably in conjunction or connection with an element at the top of the thermometer which affords a grip when shaking or handling the thermometer.

In the accompanying drawing, I have shown a single construction of thermometer embodying the invention, and wherein Fig. 1 is a rear elevation of a clinical thermometer with the invention applied thereto;

Fig. 2 is a front elevation of the thermometer shown in Fig. 1; and

Fig. 3 is a top plan view of the gripping and indicating element.

Referring to the drawing, the numeral 5 designates generally the substantially triangular stem or body of the thermometer having at its lower end a mercury bulb 6 which communicates with the capillary tube 7, extending upwardly through the stem 5 to adjacent the top of the thermometer and in which the column of mercury rises in response to temperatures to which the bulb 6 is subjected. The form of thermometer shown in the drawing has three sides, one of which, the back or base 8 has applied thereto or disposed in front thereof, a coating or strip of non-transparent material, preferably white. One of the other walls 9 has scale markings 10 thereon, and the third wall 11 has numerals applied thereon in proper relation to the scale markings. The walls 9 and 11 converge toward each other from the wall 8 and at the point where they meet there is a magnifying portion 12 alined with the capillary tube 7 and mercury column which rises therein.

In accordance with my invention, there is provided on the thermometer a clearly visible indicating means, preferably in the nature of a knob at the end of the thermometer stem and having an area of its surface at the front of the thermometer, that is, above the lens, clear, and a portion of its surface at the rear colored, the said areas being so arranged and proportioned that when the thermometer is turned the clear portion of the knob will appear as of a solid color at the very instant that the lens is in proper alinement with the mercury tube in the line of vision of an observer.

In the preferred embodiment of the invention shown in the drawing, the foregoing is accomplished by providing at the top of the body 5 a substantially spherical clear knob 13 of magnifying characteristics. This knob conveniently serves as a grip when handling or shaking the thermometer. Above the back wall 8 of the thermometer and in a plane common to one through the lens 12 and capillary tube 7, I provide on the knob 13 a spot or mark 14 of some readily discernable color, such as blue or red, as shown in Figs. 1 and 3. When a thermometer provided with the magnifying element or knob 13 is turned across the line of vision of an observer, the spot 14 is eventually magnified at a definite point in the line of vision so that the knob 13 exhibits itself as of a solid color corresponding to that of the spot 14 which it magnifies, as shown in Fig. 2. At this very instant or relative position the lens 12 and mercury column are also properly alined in the line of vision of the observer, whereby the mercury column is magnified and its position or height relative to the scale on the side 9 is clearly discernable.

Thus, I provide by a very simple and inexpensive construction an efficient means of facilitating the reading of clinical thermometers while at the same time providing an effective grip for handling and shaking of the thermometer. The size of the marking 14 is calculated according to the magnifying power of the element 13, and the position of the marking 14 is always such, that the element 13 will appear as a solid color at the instant that the lens 12 and tube 7 are properly alined in the line of vision of an observer. The marking 14 may be applied in any manner and may be of any material.

It is not absolutely essential to provide the indicating means, that is, the lens with the marker applied thereto, in the nature of a grip at the end of the thermometer, but this form of the invention is preferable as accomplishing the dual purpose specified.

I claim:

1. In a clinical thermometer having a scale, mercury column, and lens to magnify the mercury column for clear reading of its height relative to the scale when said lens and column are properly alined in the line of vision of an observer, means to visibly indicate when said column and lens are so alined, comprising a magnifying element independent of said lens, and a mark positioned relative to said lens for magnification thereby, said element and mark being of such relative proportions that the element will exhibit across its entire width the color of the mark at a definite position of the element and mark in the line of vision of an observer and being so arranged relative to the said lens and column that the said definite position is established when the lens and column are also alined in the line of vision of the observer.

2. A clinical thermometer having a scale, a mercury column and lens to magnify the mercury column for reading of its height relative to the scale when said lens and column are properly alined in the line of vision of an observer, a magnifying element at the top of the thermometer independent of said lens, a mark on said element, said element and mark being of such relative proportions that the element will appear of the same color as said mark at a definite position of the element and mark in the line of vision of an observer, and said mark being arranged on said element in a plane common to the lens and mercury column whereby said element appears as of the same color as the mark at same instant that the lens and mercury column are alined in the line of vision of an observer.

3. The structure of claim 2 wherein said element comprises a substantially spherical knob on the end of the thermometer affording a grip when shaking the thermometer.

4. A clinical thermometer provided with a transparent knob at one end, a portion of the knob being colored and the remaining portion uncolored and said portions being so arranged relative to each other and the indicating elements of the thermometer that the uncolored portion when confronting the eye of an observer appears as of the color of the colored portion when the indicating elements of the thermometer are properly alined in the line of vision of the observer.

LOGAN EISELE.